June 19, 1934.  R. J. MINSHALL  1,963,416
AIRPLANE STRUCTURAL ELEMENTS
Filed March 7, 1932
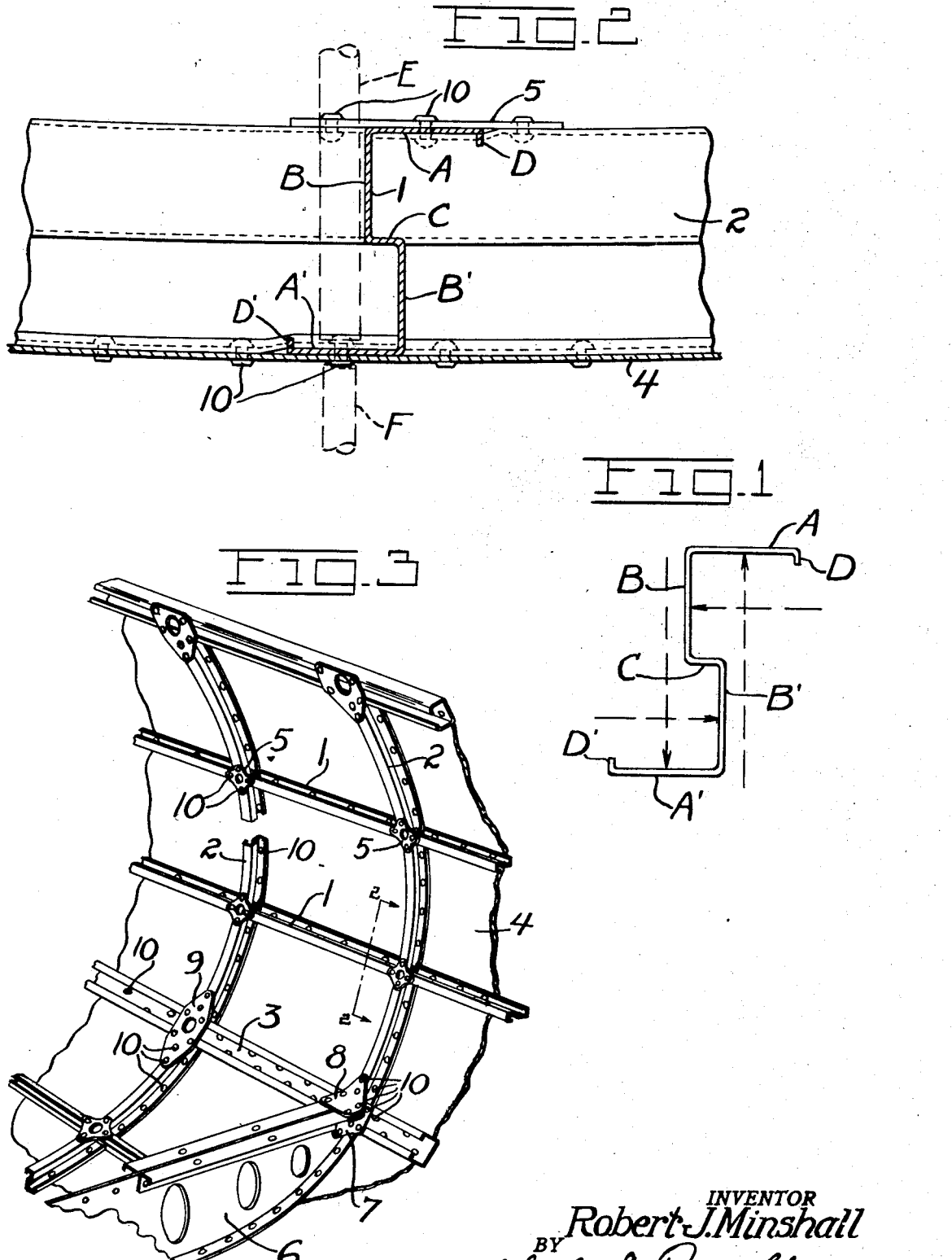
INVENTOR
Robert J. Minshall
BY Charles L. Reynolds
ATTORNEY Patented June 19, 1934

1,963,416

UNITED STATES PATENT OFFICE 1,963,416

AIRPLANE STRUCTURAL ELEMENTS

Robert J. Minshall, Seattle, Wash., assignor to Boeing Airplane Company, Seattle, Wash., a corporation of Washington Application March 7, 1932, Serial No. 597,255

10 Claims. (Cl. 189—37)

Structural members, intended for use in airplanes, must have maximum strength and minimum weight. It is also essential that they be as freely open as possible to permit the operations of drilling, reaming, riveting, bucking up rivets, and cutting out rivets previously placed. It is desirable that all surfaces exposed to atmospheric conditions or to condensation be open and accessible after incorporation in the finished structure, so that condensation and other moisture can be wiped off them, and the structure thus guarded against deterioration and against the collection of extra weight in the form of moisture or ice. They must be capable of bending without destruction of the section, yet must have inherent stiffness to resist deformation, lateral displacement of the flange portion, and collapse or bending of the web portion, whether incorporated in straight sections or in curved sections.

It is the object of my invention to incorporate the advantages enumerated above in a structural member particularly intended for use in airplane structures, yet capable of other uses, which will more nearly incorporate all the various advantages enumerated above than other structural members of which I am aware.

My invention comprises the novel structural member, illustrated in the drawing, and which will be hereinafter described and more particularly defined by the claims.

The accompanying drawing, in Figures 1 and 2, shows the structural member itself, and in conjunction with other members (the section of Figure 2 being along the line 2—2 of Figure 3), and Figure 3 illustrates how a typical airplane body or fuselage structure can be built up with the use of such members.

The invention is illustrated in Figure 3 incorporated in a monocoque fuselage construction, such as is currently employed in standard Army pursuit ships, wherein the members 1 extend longitudinally and are usually termed longérons, and members 2 extend between the members 1, and between these members and other heavier and stronger longitudinal members 3, the members 2 being circumferential stiffening members, this whole structure then supporting a sheet metal covering or skin, indicated at 4. The structural members are usually formed by drawing a metal plate through a die into the desired shape. The longitudinal and circumferential stiffeners are usually, in such structures, connected together by braces 5 to which the members 1 and 2 are secured, and it is generally desirable to incorporate whole or partial bulkheads 6 as transverse stiffening members, these being joined by junction plates such as 7 and 8. For the securement of other parts, or for the support of members to be incorporated in the structure, plates such as 9 may be secured to the stiffening members. All such joints ordinarily require the use of rivets, generally designated 10, since the material most frequently used, duralumin, is not susceptible of welding. It must be treated carefully, to avoid cracking and breaking.

Sections, such as that shown at 3, and other analogous sections, require the drilling of the rivet holes from the outside only, since inwardly directed stiffening flanges prevent the drill being inserted into the inner side of the structural member. Furthermore, it is not easy to get a tool in proper position relative to the head of a rivet to buck it up or to cut it out after it has once been placed, and it is difficult to wipe off the interior of such a section because of its nearly closed character. More especially, it is impossible to do so if the closed side of the section is placed next to the skin 4.

My structural member, devised to avoid such disadvantages, comprises two web portions B and B', slightly offset one from the other, but preferably in parallel planes. I prefer, also, that the width of these two portions B and B' be equal. The cross-section is best seen in Figure 1.

Joined to the outer edges of the respective web portions are flange portions A and A', these ordinarily extending at right angles to the web portions to which they are joined. It is preferable, but not in all cases essential, that they be equal in width to the web portions mentioned, and therefore equal to each other. They are shown as extending in the same direction as the offset web portion, designated C. That is to say, the portions A, B and C form an abbreviated U with one short leg (the portion C), and so also do the sections A', B' and C form an abbreviated U. It is not strictly essential that the flange portions A and A' extend in the direction described relative to the offset web portion C, but certain advantages (compactness, strength, etc.) are lost if they extend opposite to the directions shown.

To facilitate riveting operations on the flange portions A and A', the offset web portion C should extend not greater than about one-third of the width of the flange portions. This leaves the median line of the flange portions, where the rivets should be located, outside of any web portion. Thus the median line of the flange portion A is outside of the web portion B', and a rivet hole may be drilled in the flange portion A, the drill extending past the web portion B' without interference. So, too, a riveting tool or a bucking up tool may be applied without interference, and a rivet can be cut out without the necessity for displacing or bending any portion of the structural element. Such tools are indicated diagrammatically at E and F in Figure 2.

To further stiffen the flange members, their free edges may be slightly flanged inwardly—that is, toward the opposite flange member—as indicated at D and D'. These flanges will not extend inward sufficiently to interfere with a tool placed in the median line of the web portions B or B', where it is frequently necessary to secure rivets.

Such a section has extreme lightness, yet is stiff. Whereas a channel section has two webs, in this section there is only one web extending from the flange member A to the flange member A'. It may be easily formed, and when in use has four open faces to which rivets can be secured. It is particularly easy to rivet to the web portions B or B'. It can be drilled and it can be riveted from any side, not only from the outside, as in the case of channel sections such as that known at 3. It adapts itself readily to such structures as monocoque fuselages—for instance, military pursuit ships which must be light and extremely fast. Because it will frequently be used in curved lengths (for instance, the nose portions of wings and ribs), it will not readily permit lateral displacement of the flange portion A relative to the flange portion A', but it is not to be assumed that such displacement will readily take place if the member is used in straight lengths, for the offset web portion C will not only resist lateral bending action, but will so stiffen the web as to resist quite substantially any tendency for lateral displacement of one flange relative to the other. The section may be bent in the plane of the web as readily as any section of equivalent strength, perhaps the more so since the web is broken into two parts instead of extending as one continuous web in a single plane.

I have mentioned that such sections are usually formed by drawing a plate through a die or dies, and this is the usual way of making them, because it is simple and rapid, but such an open section as this is adapted to be formed by bending operations, and I desire to have it understood that I do not limit myself to the formation of the section in any one way.

What I claim as my invention is:

1. A structural member formed of sheet metal and having two connected web portions slightly offset one from the other, and oppositely directed flange portions each projecting from that side of its web portion which is towards the offset portion, and projecting to a distance such that its median line is outwardly of the offset web portion.

2. A structural member formed of a single piece of sheet metal, and having two web portions slightly offset one from the other, oppositely directed flange portions each projecting from that side of its web portion which is towards the offset portion, and projecting to a distance such that its median line is outwardly of the offset web portion, and a stiffening flange upturned at the outer edge of each of said flange portions.

3. A structural member for use in airplanes comprising in succession a flange portion, a rectangularly disposed web portion, an offset web portion opposite the flange portion and extending in the same direction, for approximately one-third the width of the flange portion, a second web portion parallel to the first, and a second flange portion parallel to the first, but extending in the opposite direction for approximately three times the spacing between the parallel web portions.

4. A structural rib member intended for use in airplanes, comprising in succession a flange portion, an equal web portion disposed at right angles to the flange portion, an offset web portion of substantially one-third the width of the other two portions, and extending parallel to and in the same direction as the flange portion, a second web portion equal and parallel to the first, and a second flange portion equal and parallel to the first, but extending in the opposite direction.

5. A structural member for use in airplanes comprising two flanges disposed in spaced parallel planes in overlapped relationship, and a web portion extending from the overlapped edge of each flange towards and substantially half way to the opposite flange, and a lateral connecting portion joining the adjacent edges of each of said web portions, the overlapped relationship of the flanges being such that the median line of each flange lies outside of the plane of the web joined to the opposite flange.

6. A one-piece structural member formed of sheet metal comprising two flanges in spaced parallel planes disposed with the edge of one slightly overlapping an edge of the other, and extending in opposite directions from their overlapping portions, and a web portion extending substantially at right angles from the overlapped edge of each flange towards the opposite flange, and a lateral connecting portion joining the adjacent edges of each of said web portions, and connecting with the latter along an angular break.

7. A structural member formed of sheet metal comprising two geometrically similar angle sections disposed each with one side parallel to and extending in a direction opposite to a side of the other, the other sides of the two angle sections being disposed in parallel planes and extending toward each other, and a section mutually perpendicular to said last mentioned sides joining the same, each of the first-mentioned sides extending sufficiently beyond the second side of the complemental angle section to permit passage of a rivet therethrough perpendicularly to the first-mentioned side, past the second side, and perpendicular contact therewith of suitable riveting tools.

8. A structural member formed of one piece of sheet metal comprising two right angle sections disposed with a side of one section in a plane parallel to and spaced from the plane of a side of the other section, the other sides of the angle sections extending towards each other in spaced parallel planes, and a plane section perpendicularly interconnecting such other sides of the angle sections.

9. A structural member for use in airplanes having two web portions disposed in planes slightly offset one from the other, an offset portion connecting the two first portions, and at right angles to both, and two parallel flange portions, one projecting from each of said web portions of widths more than twice exceeding that of the offset portion.

10. A rib member for use in airplane structures having two equal web portions slightly offset one from the other, an offset web portion connecting the two first web portions, and at right angles to both, and two oppositely directed flange portions attached one at the outer edge of each of the respective web portions, of width more than twice exceeding that of the offset web portion.

ROBERT J. MINSHALL.